United States Patent [19]

Chiodini

[11] Patent Number: 4,881,300
[45] Date of Patent: Nov. 21, 1989

[54] MOLDING APPARATUS TO MOLD GROUND MEAT OR THE LIKE

[75] Inventor: Andrea S. Chiodini, Bologna, Italy

[73] Assignee: La Minerva Di Chiodini Mario S.r.l., Bologna, Italy

[21] Appl. No.: 280,347

[22] Filed: Dec. 6, 1988

[30] Foreign Application Priority Data

Dec. 23, 1987 [IT] Italy ............................ 12608 A/87

[51] Int. Cl.⁴ .............................................. A22C 7/00
[52] U.S. Cl. ........................................ 17/32; 426/513
[58] Field of Search ............... 17/32, 45; 426/513; 425/557

[56] References Cited

U.S. PATENT DOCUMENTS

| | | | |
|---|---|---|---|
| 4,126,704 | 11/1978 | McCarthy et al. | 426/513 |
| 4,147,485 | 4/1979 | Zimmerman | 17/32 |
| 4,272,864 | 6/1981 | Holly | 17/32 |
| 4,356,595 | 11/1982 | Sandberg et al. | 425/557 |
| 4,541,143 | 9/1985 | Holly | 17/32 |
| 4,597,135 | 7/1986 | Holly et al. | 17/32 |
| 4,768,941 | 9/1988 | Wagner | 17/32 |
| 4,821,376 | 4/1989 | Sandberg | 17/32 |

Primary Examiner—Willis Little
Attorney, Agent, or Firm—Larson & Taylor

[57] ABSTRACT

A molding apparatus particularly adapted to be associated to a meat chopper to mold the extruded ground meat into hamburgers. The said apparatus is provided with a feeler or snesor which disactivates the meat chopper when a hamburger has been formed and which re-activates said meat chopper when the emptied mold is re-introduced into the formation chamber. The feeler or sensor is mounted on the housing or body of the meat chopper so as to be self-adjustable as to its spacing from the formation mold when the positioning of the molding apparatus of the invention changes due to the wear of the meat chopper knives.

7 Claims, 3 Drawing Sheets

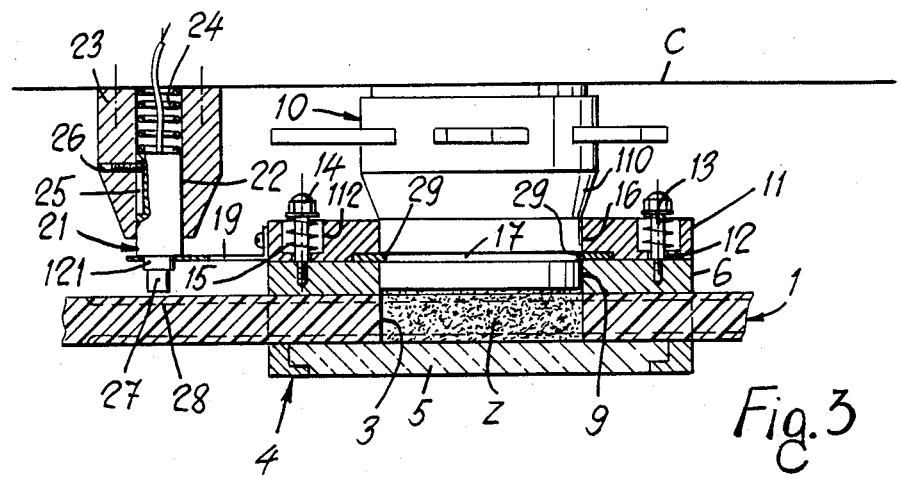
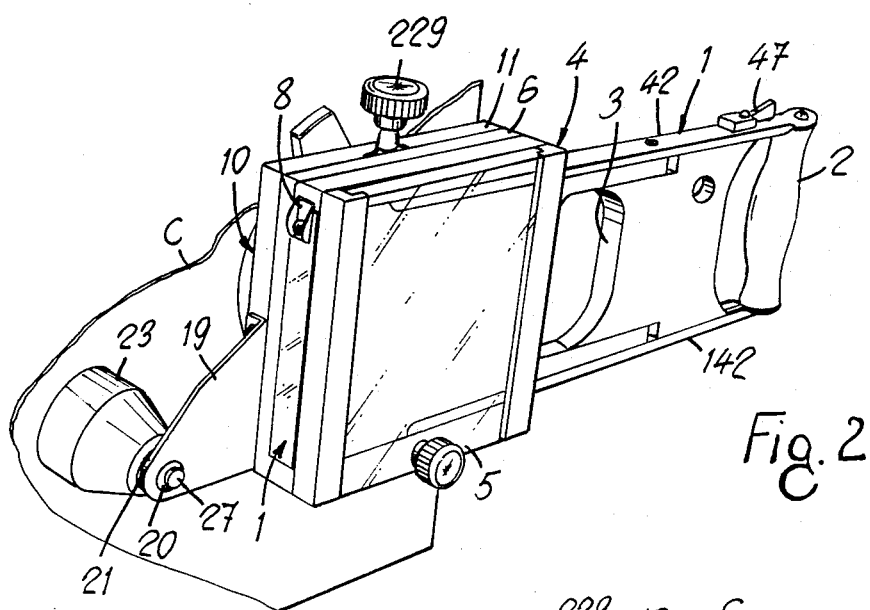
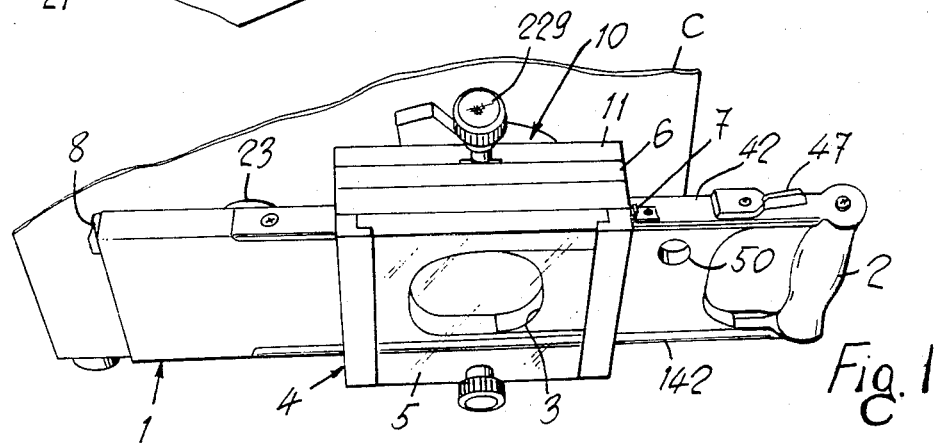

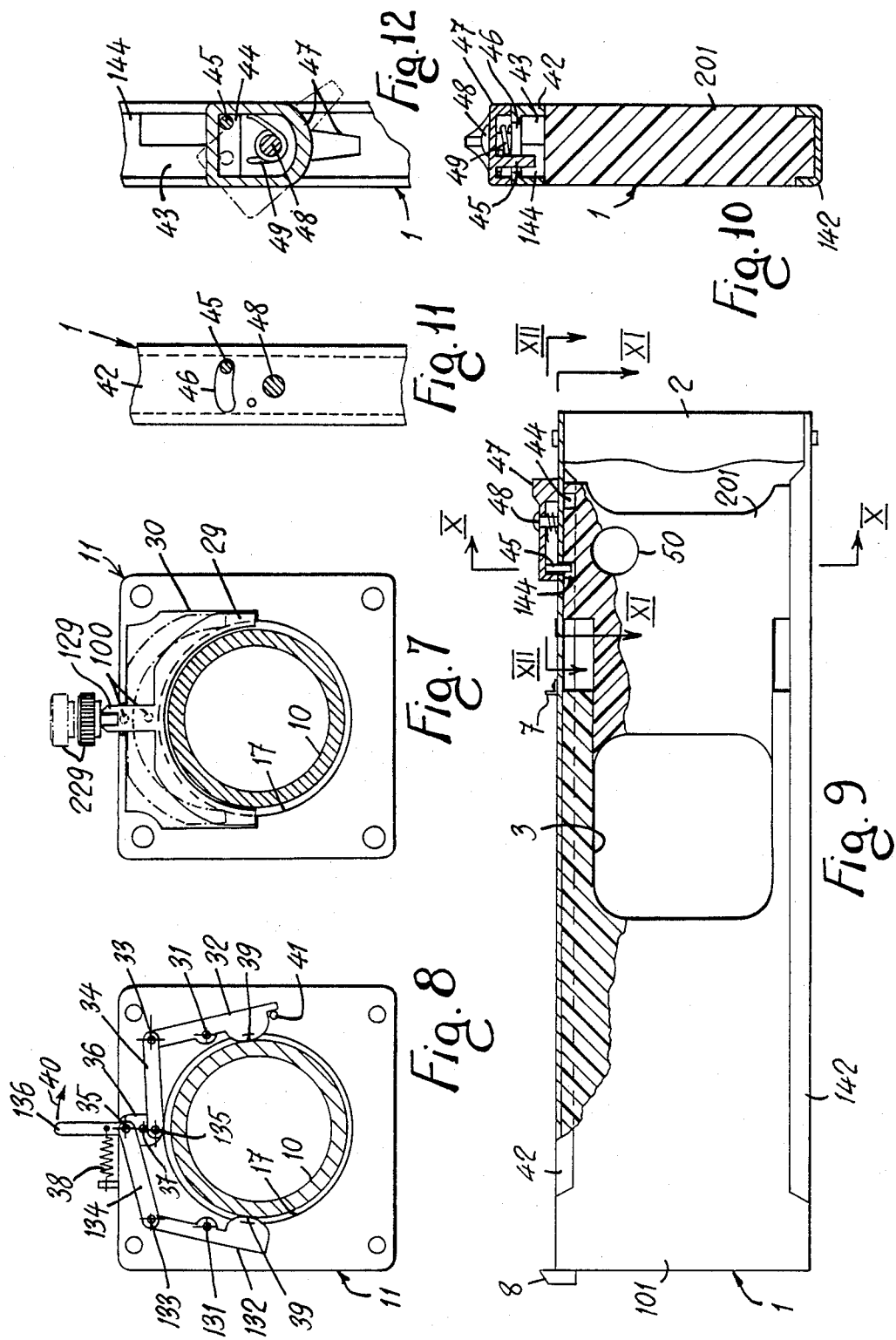

MOLDING APPARATUS TO MOLD GROUND MEAT OR THE LIKE

BACKGROUND OF THE INVENTION

This invention relates to a molding apparatus to be associated to a meat chopper or the like, to mold the extruded ground meat into the so called "hamburgers". Devices of this type are described, for example, in the Nos. FR-A-1.299.087, 2.491.728, 2.539.958, 2.563.413, 2.589.686, in the U.S. Pat. No. 4.334.339, and in the No. DE-A-2.548.023. All the above mentioned prior art devices comprises a comparatively complicated structure. In the known devices which use a feeler or sensor to disactivate the meat chopper automatically on completion of the hamburger-forming step, moreover, no adjustment is devised to maintain constant the distance between said feeler and the respective control portion on the forming mold. Said distance changes when the meat chopper knives are re-sharpened and when, due to their wear, the distance of said device from the meat chopper body changes.

The invention aims to overcome these and other disadvantages of the prior art devices.

SUMMARY OF THE INVENTION

According to a main feature of the present invention, the molding apparatus disclosed comprises a die, to mold the extruded ground meat for the formation of hamburgers, of the type comprising a formation chamber, a mold slidably guided in said formation chamber, a seat in said mold for receiving the extruded ground meat, a feeler or sensor mounted on a support, to detect the movement of any portion of said molding apparatus when a hamburger is being formed in said seat, means controlled by said feeler to automatically control the meat chopper, so as to disactivate it whenever a hamburger has been formed in said seat, and to re-activate it when the emptied mold is re-introduced into said formation chamber, and resilient means for urging said sensor away from the meat chopper, the molding apparatus being further provided with means mounted on the die of the meat chopper, provided with an extension interferring with the sensor-supporting means or with the body of said sensor and which keeps said sensor always suitably positioned with respect to the movable portion of the hamburger-forming molding apparatus, regardless of the changes in the positioning of said molding apparatus due to the wear of the cutting knives.

BRIEF DESCRIPTION OF THE DRAWINGS

Further characteristics and advantages of the molding apparatus according to the invention will become apparent from the following description of some preferred embodiments thereof, shown in the accompanying drawings, wherein:

FIGS. 1 and 2 are perspective views of the molding apparatus, with the mold in the hamburger-forming position and in the hamburger-discharging position, respectively;

FIGS. 3, 4, 5 and 6 are top plan sectional views of the molding apparatus of FIGS. 1 and 2 taken on a horizontal plane and in successive steps of the working cycle;

FIGS. 7 and 8 are two embodiments of the means for mounting the device at the discharge mouth of a meat chopper;

FIG. 9 is a front elevational and partly sectional view of the adjustable mold, and FIGS. 10, 11 and 12 show further constructional details of the adjustable mold of FIG. 9, taken on the sectional lines X—X, XI—XI and XII—XII, respectively.

DESCRIPTION OF THE PREFERRED EMBODIMENT OF THE INVENTION

Figure 4:
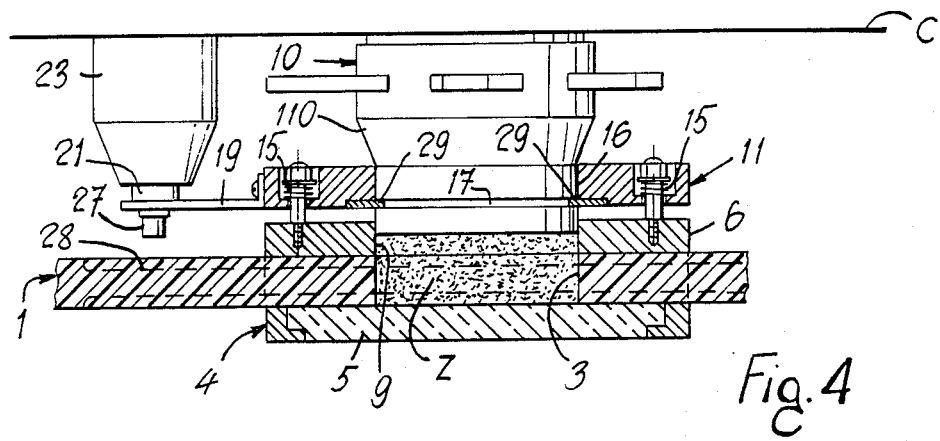

In the FIGS. 1, 2 and 3, to which reference is made first, the numeral 1 indicates a flat mold which is provided at one end thereof with a handle 2 and is formed intermediately with at least one through-opening or seat 3 wherein the meat for the formation of a hamburger is collected and pressed. The constructional details of the mold 1 and the possibility to adjust the width of the seat 3 will be discussed further in the following description.

The mold 1 is arranged horizontally and is mounted so as to be movable in drawer-like fashion in a chamber 4 the front wall 5 of which is in close contact with the corresponding face of said mold and is preferably (though not necessarily) made of transparent plastics material, said wall being mounted so as to be removable when desired to permit either the chamber 4 to be cleaned and the minced meat to be discharged freely when the meat chopper is to be used in the conventional manner.

The mold 1 is provided with stop projections 7 and 8 which co-operate alternately with the sides of the chamber 4 to ensure a correct positionin of said mold 1 in the hamburger-forming step and hamburger-discharging step, as shown in FIGS. 1 and 2, respectively.

The rear wall 6 of the chamber 4, which operates in close contact with the corresponding surface of the mold 1, has a considerable thickness at least at the central region thereof where said plate is formed with a through-opening 9 of round cross section and of such a size as to be sealingly engaged in an axially displaceable manner by a conventional die 10 which is threadedly mounted on the discharge mouth of the meat chopper and which holds therein the assembly of knives and shave perforated discs.

When the mold 1 is in the hamburger-forming position, as shown in FIG. 1, the seat 3 is located within the chamber 4 and communicates with said opening 9.

According to the invention, exteriorly superposed on the plate 6 is a similar plate 11 which is provided at its corner regions with corresponding holes 12 which are traversed by respective studs 13 one end of which is screwed in blind holes formed in the plate 6 and the other end of which is provided with either a fixed head or an insert nut 14 to hold, co-axially on said studs, springs 15 which act against the plate 11 to hold it closely against the adjacent plate 6. The springs 15 are of the so-called cask-shaped type and are accommodated entirely or partly within enlarged portions of the holes 12.

The plate 11 is formed with a round through-opening 16 equal to and co-axial with the opening 9 in the plate 6 and traversed also by said die 10 which is formed with an annular recess 17 adapted to be engaged in a disengageable manner by opposite screws mounted conventionally on said plate 11, or by other suitable means to be discussed below, to ensure the required removable fastening of our device to said die 10.

It will be noted in FIGS. 2 and 3 that in order to prevent any undesired rotational movement of said device about said die 10, one side of the plate 11 has affixed thereto a lug 19 which is provided at the end thereof with a hole 10 co-operating with a portion which is solidary with the body C of the meat chopper. As shown in the detail of FIG. 3, said hole 20 in the lug 19 co-operates as a shoulder with the reduced-diameter end portion 121 of a cylindrical body 21 which is parallel to said die 10 and is axially movable in the seat 22 of a support 23 which is adapted to be secured to the body C of the meat chopper. The cylinder 21 is urged axially by a cylindrical coil spring 24 in a direction outwards from its guiding seat 22; however, said cylinder is retained therein by the co-operation of its longitudinal keyway 25 with the end of a screw 26 which is screwed radially in the support 23. Mounted in the cylinder 21 is a proximity sensor 27 the active portion of which protrudes from the outer reduced-diameter end portion of said cylinder and which is connected to the electrical actuating circuit of the meat chopper so as to ensure the automatic operation of the latter by the method described below. The parts 21–23 and 19 are made of any material that does not affect the operation of said sensor 27.

When the mold 1 is in the hamburger-forming position, as from FIG. 3, the sensor 27 detects the presence of a metallic portion 28 (see below) of the mold 1, whereby if the general switch has been closed the meat chopper keeps working as far as said co-operation between the parts 27 and 28 subsists.

A first important advantage resulting from the device according to the invention is as follows. When the meat chopper knives are re-sharpened and placed again into their seats, the die 10 gets nearer to the meat chopper body C proportionally to the decrease in the thickness of said knives. In the device of the invention, the lug 19 causes, as a result, an axial displacement of the cylinder 21, against the action of the spring 23, and keeps the required distance between the sensor 27 and portion 28 of the mold 1 constant, whereby said sensor may operate correctly.

Figure 5:
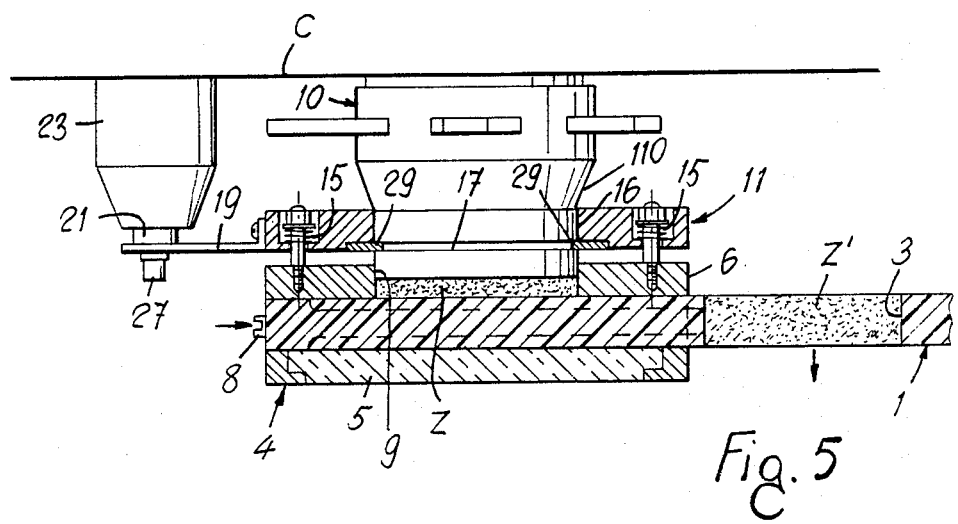

The device described above operates as follows. With reference to FIGS. 1 and 3, it will be noted that following the activation of the meat chopper and with the mold 1 in the hamburger-forming position, the minced meat Z fills the seat 3 and is uniformly compacted therein. When the meat-compacting force overcomes the load of the springs 15, the bottom plate 6 of the chamber 4 moves away from the plate 11, as shown in FIG. 4, to a sufficient extent whereby the sensor 27 will no longer detect the presence of the portion 28 of the mold 1 and automatically disactivates the meat chopper. The displacement of the chamber 4 is of such an extent whereby a sufficient portion of the die 10 will still engage the opening 9 of the plate 6 so that the minced meat cannot escape from said chamber 4. When the meat chopper stops, the operator displaces the mold 1 longitudinally as from FIG. 5 so that the seat 3 is pulled out of the chamber 4 and the latter is engaged by a corresponding solid portion of said mold. The minced and pressed meat present in the seat 3 and constituting the hamburger Z′ gets out of the seat 3 easily and completely, also by virtue of a suitable configuration of said seat.

Unlike the known devices, the seat 3 is not defined by spring-loaded parts acting in the hamburger-discharging step, which inevitably deform the hamburger. Hamburgers which are formed by the device of the invention are characterized by an efficient and uniformly-distributed compaction. By varying the load of the springs 15, the degree of compaction of hamburgers may be modified.

Figure 6:
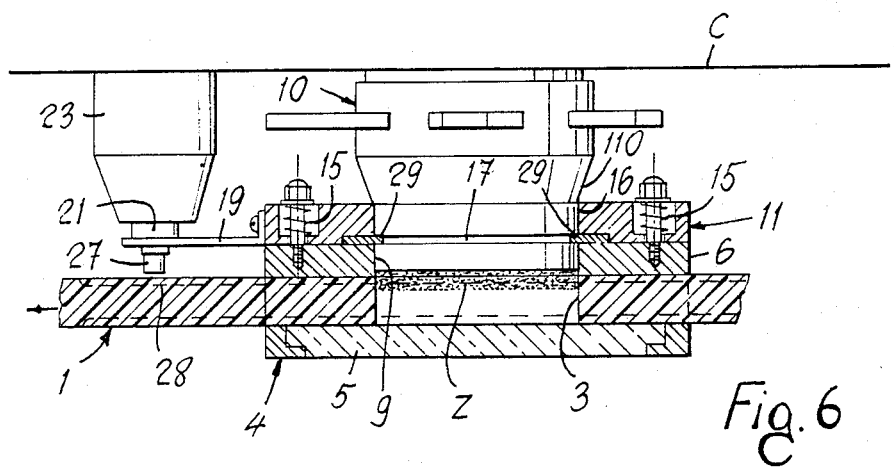

After a hamburger has been discharged, the mold 1 is moved back to its initial position. As soon as the seat 3 is again in communication with the opening 9, the amount of meat Z that had previously moved the plate 6 away from the plate 11 enters abruptly said seat 3, whereby the springs 15 will cause said plates to move back against each other. FIG. 6 shows how—as a result of this re-engagement of the plates and when the portion 28 of the mold 1 has arrived at the sensor 27—said sensor detects the presence of the portion 28 and automatically causes the re-activation of the meat chopper to repeat the cycle described heretofore.

DESCRIPTION OF SOME FURTHER EMBODIMENTS OF THE INVENTION

In lieu of said opposed fastening screws, as shown in FIGS. 3 and 7, the plate 11 may be formed, e.g. in the face opposite to the plate 6, with a flat-shaped seat 30 machined by a milling or other suitable operation and of such a size and configuration as to accommodate a flat-shaped fork 29 which may be displaced in guillotine fashion with respect to the opening 16 and which is suitably guided that way due to the co-operation of rectilinear portions of its sides with corresponding rectilinear parallel portions of the sides of said seat 30. The seat 30 is usually closed by the plate 6 but, if desired, it may be closed by a small supplementary plate fixed to the plate 11 in any suitable manner. The construction of the assembly is such that when the fork 29 has fully advanced into the seat 30, a suitable portion of the inner arcuated edge of said fork will protrude into the opening 16 and engages a corresponding portion of the annular recess 17 formed in the die 10, whereby the latter is locked to the plate 11 which, preferably, rests at the rear side thereof against the enlarged portion 110 of said die. The plate 11 may mount a spring-loaded ball (not shown) which can snappingly co-operate with corresponding recesses 100 formed in the fork 29, in order to keep the latter either in its active position or in its raised position disengaged from the recess 17. The fork 29 is provided centrally with an extension 129 projecting from the upper side of the plate 11 and provided with a knob 229 to be gripped by the operator. It is apparent that the device just described simplifies considerably the application of the device to a meat chopper and its removal therefrom.

According to the modification of FIG. 8, interfulcrumed on a face of the plate 11 at 31-131 are equal and flat-shaped levers 32, 132 which are pivoted with their opposite ends at 33-133 to equal links 34-134 which, in turn, are pivoted at 35-135 to a lever 36 fulcrumed at 37 to the plate 11 and provided with an extension 136 for actuation by the operator. The pivots 35-135 are equally spaced from the fulcrum 37. A spring 38 acts on the just described mechanism so as to keep the suitably shaped portions 39 of the levers 32-132 protruding by the same extent into the opening 16 of the plate 11 so as to engage the annular recess 17 of the die 10. By acting on the extension 136 of the lever 36 so as to rotate the latter in the direction of the arrow 40, the end portions 39 of the levers 32-132 are moved away with a self-centering displacement with respect to the die 10, whereby permitting the parts 11 and 10 to be either engaged or disengaged. A stud 41 is fixed to the plate 11 and acts as a limit stop for the lever 32 or for any other portion of the said mechanism, to provide a correct rest position therefor, against the action of the spring 38.

It is to be understood that the lever 36 may also be provided with a small extension opposite to the extension 136, for co-operation with the annular recess 17.

According to a further modified embodiment, in lieu of the levers 32-132 there may be provided spring-loaded pins adapted to co-operate either tangentially or radially with the annular recess 17 and connected to a central actuation system, all being conceived and carried out easily by those skilled in the art.

It will be noted in FIGS. 9, 10, 11 and 12 that the mold 1 is made of two parts of non-toxic plastics material, the part 101 of which terminates in a U-shaped configuration which is engaged by the stem of the T-shaped part 201, so as to define the hamburger-forming seat 3. Secured longitudinally to the sides of the part 101 are respective U-shaped frames 42-142, made preferably of stainless steel, which extend beyond the part 101 to support a handle 2 and to serve as guides for the part 201. One of the sides by means of which the part 201 slides in the frames 42-142, is formed with a longitudinal recess 43 and, at the sides thereof, with small recesses 44-144 wherein there may be positioned a pin 45 which is passed through a slot 46 across the frame 42 and which is solidary with a lever 47 pivoted at 48 on said frame and urged by a "safety pin" spring 49 towards the position shown with solid lines in FIG. 12. By acting on the lever 47 and by displacing it to the position shown with broken lines in FIG. 12, said pin 45 is transferred into the longitudinal recess 43, so that the part 201 of the mold may be slided longitudinally to change the width of the seat 3. By releasing the lever 47, the latter is returned by the spring 49 to the locked position as soon as a recess 44-144 is registering with the pin 45. In order to facilitate the displacement of the part 201, the latter is formed with at least one small hole 50 to be engaged by a finger of the operator.

With reference to FIG. 3, it will be noted that the portion 28 of the mold adapted to be detected by the proximity sensor 27, is constituted by a portion of the outer edge of the frame 142. The limit stop 8 is removable or positionable otherwise to permit the mold 1 to be withdrawn from the chamber 4 when the forming device of the invention is to be cleaned.

It is to be understood that many changes and modifications, especially of constructional nature, may be made to the device described above; for example, according to said modifications, the proximity sensor 27 may be replaced with another type of sensor or feeler which may be supported for example by a flat spring secured to the body C of the meat chopper.

I claim:

1. A molding apparatus particularly adapted to be associated to a meat chopper or the like comprising a die to mold the extruded ground meat for the formation of hamburgers, a formation chamber communicating with said die, a mold slidably guided in said formation chamber, a seat in said mold for receiving the extruded ground meat, a feeler or sensor monted on a support, to detect the movement of any portion of said molding apparatus when a hamburger has been formed in said seat, means controlled by said feeler to automatically control the meat chopper, so as to disactivate it whenever a hamburger has been formed in said seat, and to re-activate it when the emptied mold is re-introduced into said formation chamber, resilient means for urging said sensor away from the meat chopper, the said molding apparatus being further provided with means mounted on the die of the meat chopper, which are in turn provided with an extension interferring with the sensor-supporting means or with the body of said sensor or with both said elements, and which keeps said sensor always suitably positioned with respect to the movable portion of the hamburger-forming molding apparatus, against the action of said resilient means associated to said sensor, regardless of the changes in the positioning of said molding apparatus due to the wear of the cutting knives.

2. A molding apparatus according to claim 1, wherein said sensor is a proximity switch mounted on a small cylindrical body or cylinder the axis of which is parallel to the die and which is guided in a fixed hollow body provided with a spring urging said cylinder outwards and is provided with key means to restrain said cylinder while permitting a certain axial displacement thereof against the action of said spring, the said extension of the portion of the die which is apt to interfere with the sensor-supporting means being in the form of a lug the end portion of which is formed with a hole adapted to co-operate with a reduced-diameter end portion of said cylinder, in order to prevent any undesired rotational movement of said molding apparatus on the die of the meat chopper.

3. A molding apparatus according to claim 1, wherein the formation chamber through which the mold with the hamburger-forming seat is reciprocable in a drawer-like fashion comprises a rear wall which is centraly provided with an opening of such a diameter as to be engaged with a sufficient lateral seal but with freedom of displacing axially, by the free end portion of the die of the meat chopper, said die being provided with an annular recess which permits, through suitable means, to removably fasten to said die a further plate also centerly provided with an opening traversed by said die, said last-mentioned plate being provided with the lug which co-operates with the sensor-supporting cylinder and being placed over the rear wall of the formation chamber and held tight thereon by suitable resilient means, the arrangement being such that when the seat in the mold is filled with minced meat, the pressure of said meat coming out of the meat chopper causes the formation chamber to move away from said anchoring plate against the action of said resilient means and this movement is detected by the sensor which, automatically, stops the meat chopper.

4. A molding apparatus according to claim 1, wherein the opening in the rear wall of the hamburger-forming chamber, instead of being sealingly slidable on the die of the meat chopper, is sealingly slidable on an annular collar fixedly provided on the anchoring plate co-axially with the opening thereof.

5. A molding apparatus according to claim 1, wherein the anchoring means associated with the plate of said molding apparatus may be in the form of levers, forks, pins or other suitable means, which may be urged by springs to their active position and connected to a central control means permitting to disactivate said means quickly during the application of the molding apparatus on the meat chopper or its removal therefrom.

6. A molding apparatus according to claim 1, wherein the anchoring means associated to said anchoring plate comprises a fork which is mounted, so as to be displaceable in guillotine fashion, in a seat formed in said anchoring plate, and is formed at a central position with a protruding extension with an actuation knob, the arrangement being such that when completely inserted into its seat, said fork will engage a portion of the annular recess formed in the die of the meat chopper, so as to fasten the molding apparatus of the invention thereto, friction means or snap means being provided, if desired, to keep said fork in either the lowered and raised rest positions.

7. A molding apparatus according to claim 1, wherein the formation mold comprises two parts, one of which terminates in a U-shaped configuration which is engaged by the stem of the other part which has a T-shaped configuration and whose oppositely-directed head portions are slidable longitudinally in the free stretches of U-shaped guides by which the other part is connected to a handle for actuating the mold, one of said guide stretches having pivoted thereon a small lever fixedly provided with a pin which is passed through a slot across said guide and which may be displaced to engage one of the recesses provided on the adjacent side of the movable part of the mold, said lever being urged to the lock position by a "safety-pin" spring.

* * * * *